Feb. 21, 1961  T. R. WHITNEY  2,972,276
SCANNING DISCS FOR RADIANT ENERGY RESPONSIVE
TRACKING MECHANISMS
Filed Sept. 23, 1953

INVENTOR.
THEODORE R. WHITNEY
BY P. H. Firsht
ATTORNEY.

United States Patent Office 2,972,276
Patented Feb. 21, 1961

2,972,276

SCANNING DISCS FOR RADIANT ENERGY RESPONSIVE TRACKING MECHANISMS

Theodore R. Whitney, Santa Barbara, Calif., assignor to the United States of America as represented by the Secretary of the Navy Filed Sept. 23, 1953, Ser. No. 382,013

3 Claims. (Cl. 88—1)

(Granted under Title 35, U.S. Code (1952), sec. 266)

The invention herein described may be manufactured and used by or for the Government of the United States of America for governmental purposes without the payment of any royalties thereon or therefor.

The present invention relates to radiant energy responsive seeking and tracking mechanisms and more particularly to improvements in scanners or scanning discs utilized for chopping an image or beam of rays which fall upon the radiant energy responsive device.

In certain categories of missiles, radiant energy responsive seeking and tracking mechanisms are utilized which are intended to detect airplanes or other dark or bright objects or targets against a sky background. A scanning disc is utilized which modulates the radiant energy from the target as it falls upon the radiant energy responsive device, whereby the presence of the target can be detected. In systems as presently known the target signal thus generated can be compared to a reference voltage otherwise generated in such manner that the direction of deviation of the target from the line of sight, that is, from the center of the scanning disc, can be ascertained. The systems as presently known including the scanning disc can be considered as having a target detecting or sensing function as well as a phase discriminating function, that is, the function of determining in what direction the target deviates from the projected line of sight.

In the systems previously known there is a modulated signal representing a signal from the target as well as a modulated signal representing modulation of the sky background being viewed through the optical part of the system. The sky background normally varies considerably in radiometric brightness and the chopping or scanning of the sky background normally results in signals of relatively high amplitude and low frequencies. By using appropriate band pass filters the sky signal of large energy can be surpressed and by emphasizing certain harmonics of the target signal of higher frequencies a signal from the target can be reinforced and the sky background signal eliminated.

The object of the present invention is to provide reticle patterns for scanning discs of such a nature that when discs of this design operate on a light image they modulate only three space frequencies existing in that light image, the space frequency carrier and two space frequency side bands which are located as plus or minus the scanning frequency from that of the carrier. Since the operation of the reticle consists of moving it in time across the image, the modulation appears as a time function of light intensity which is received and interpreted as an electrical signal. These frequencies are chosen to be above noise frequencies caused by brightness of the sky background. In this manner while the target energy is reinforced by the use of the pattern, sky background is entirely surpressed. That is, the pattern of the scanning disc is such that the scanning disc itself completely eliminates the signal resulting from sky background. As a result with the present invention it is possible to provide a system which does not require the use of an electrical filter having critical band pass characteristics. These band pass filters having rather critical characteristics have been necessary in the past to sort out target energy from an overwhelmingly large sky signal. That is, the sky signal would be modulated in several frequencies from the fundamental to the tenth harmonic and the target signal in several frequencies both in this range and above, for instance in the eleventh, twelfth, and thirteenth harmonics. Thus an electrical filter placed at the end of the amplifier and so tuned as to pass only the eleventh, twelfth, and thirteenth harmonics would pass no energy due to chopping blue sky but only energy generated by chopping the target.

The scanning disc pattern of the present invention comprises a disc having equally spaced slits or segments, or spokes, which are alternately relatively transparent and opaque to some extent in varying degrees around the circumference of the disc. The transparency and opaqueness of the spokes vary gradually from a maximum in contrast to a minimum in contrast and back to a maximum in contrast around the circumference of the disc, so that the most transparent of the relatively transparent spokes and the most opaque of the relatively opaque spokes are next to each other on one side of the surface of the disc, and the least transparent of the relatively transparent spokes and least opaque of the relatively opaque spokes are next to each other at the opposite side of the same surface of the disc.

An object of the invention is to provide a scanning disc having the particular pattern as explained in the foregoing. This particular pattern of disc produces a repetitive voltage which may be specified mathematically as a Fourier series with time, the fundamental period being the frequency of rotation of the disc which is the scanning frequency. This particular pattern results in reinforcement of the $n/2-1$th, $n/2$th, and the $n/2+1$th harmonics and the cancellation of all others up to this order. The term $n$ which is used here is a number equal to the number of pie-shaped slits (not slit pairs); consequently, the harmonics which will be reinforced may be written $n/2-1$, $n/2$ and $n/2+1$, or if the mixed fraction is removed $(n-2)/2$, $n/2$ and $(n+2)/2$. The space transmittance function of the scanning reticle pattern has but three line components at the space frequencies, $(n-2)/2$, $n/2$ and $(n+2)/2$. These are the only space frequencies which the reticle pattern is capable of passing or reinforcing as the reticle pattern rotates thus modulating the light image of a target. These frequencies must, of course, be present in the light image in order to be reinforced in a real sense.

Further objects and numerous of the advantages of my invention will become apparent from the following detailed description and annexed drawings wherein.

Figure 1:
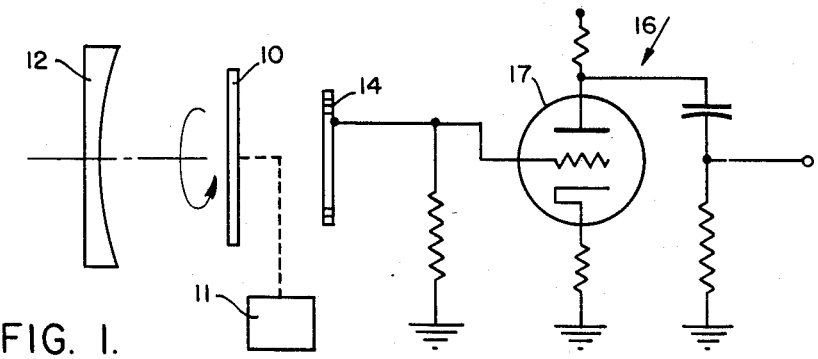
Fig. 1 is a schematic view of an elementary scanner system as referred to in the foregoing.

Referring to Fig. 1 of the drawings, numeral 10 designates a scanning disc utilized in a tracking system as referred to in the foregoing. The scanning disc is driven at constant speed by an electric motor designated at 11. As shown schematically the scanning disc 10 is located in the focal plane of an optical system designated generally at 12 which is arranged so that it may focus the image of a distant target such as an airplane upon a photocell or other radiant energy responsive device as indicated at 14. The photocell or other radiant energy responsive device is located in the input circuit to an amplifier designated generally at 16. The amplifier comprises a conventional type of amplifier tube 17 with the radiant energy responsive device located in the grid circuit thereof. The amplifier comprises a conventional plate supply and load circuit as shown and it has a conventional cathode resistor and grid resistor as shown.

Figure 2:
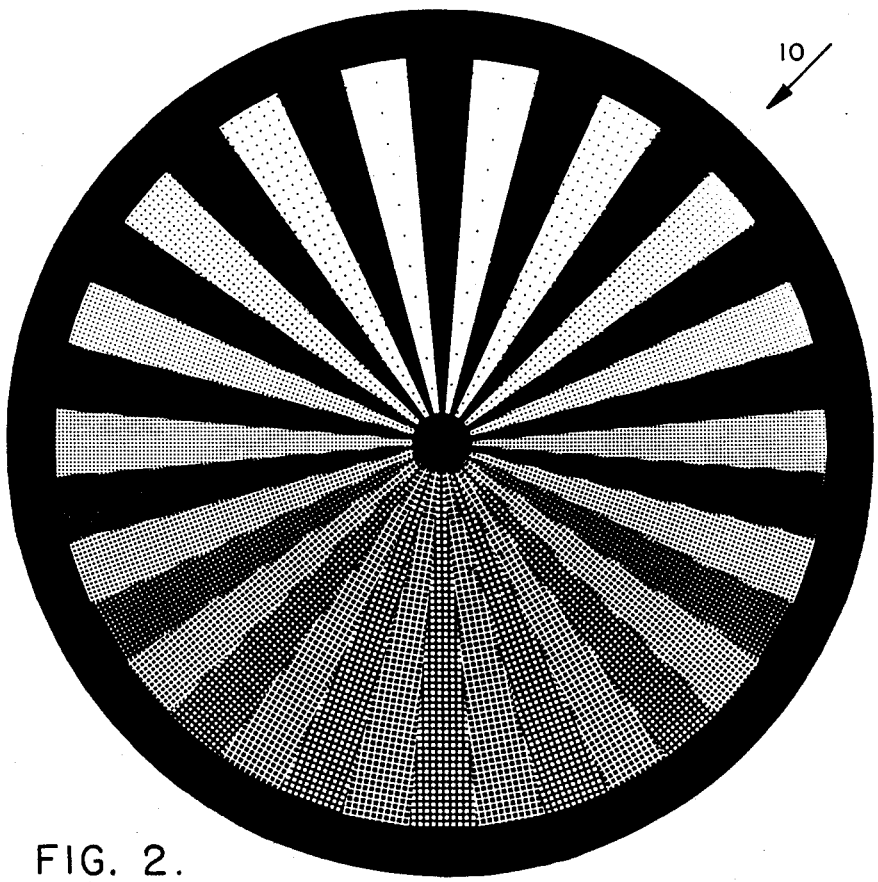
Fig. 2 is a view of one preferred form of scanning disc pattern of my invention.

Fig. 2 shows a particular scanning disc pattern wherein there are thirty-six slits or sectors. Various other numbers of slits or segments could be utilized such as, for example, twenty-four. As can be seen the slits are of equal width and are alternately transparent and opaque, the transparency and opaqueness varying gradually around the circumference of the disc. As can be seen, therefore, there is chopping of the target image as the image is passed by adjacent slits or segments of different transparency. However, there is no chopping of the entire sky background since as far as the entire sky background is concerned the variation in degree of transparency and opaqueness of the disc is gradual completely around its circumference.

The particular pattern shown in Fig. 2 is one which was utilized to modulate infra-red light. As a result it was necessary to employ a method of obtaining varied densities, that is varied opaqueness other than a photographic film. This was accomplished by way of example, by means of providing varying areas of opaque metal and glass, the areas of metal and clear glass being adjusted to secure the overall density. As can be seen, this resulted in a checkerboard pattern in each of the slits or segments. If ordinary visible light were to be modulated this could be accomplished utilizing photographic film and a continuous transmission variation and such transmission variation could be expressed in terms of a mathematical function similar to the function representing the variation using the checkerboard pattern. As pointed out in the foregoing, these patterns result in reinforcing the $n/2-1$th, the $n/2$th, and the $n/2+1$th harmonics. By choosing these frequencies to be above anything above noise in the curvature of the sky gradient, the sky background signal is entirely surpressed and this without the use of a band pass filter and particularly without the use of a filter having critical band pass characteristics.

From the foregoing, those skilled in the art will observe that I have provided an improved scanning pattern for modulating visible or infra-red radiation whereby discrimination between a target signal and sky background can be achieved without need of a filter associated with the amplifier. Various modifications and alternatives may be adopted by those skilled in the art without departing from the spirit and scope of the invention and it is intended that the herein disclosure be interpreted as illustrative of, rather than limiting upon, the invention as defined in the appended claims.

What is claimed is:

1. In a radiant energy responsive apparatus operable to track a target or the like, a scanning mechanism including a rotary disc operable to produce a repetitive voltage from modulation of the target light image and reinforcing substantially only three frequencies present in the light of the target image, said disc having a plurality of radially extending segments of equal size in the form of spokes, said spokes being alternately relatively transparent and opaque, the transparency and opaqueness of said spokes varying gradually from a maximum in contrast to a minimum in contrast and back to a maximum in contrast around the circumference of the disc such that the most transparent of said transparent spokes and the most opaque of said opaque spokes are next to each other on one side of one flat surface of said disc, and the least transparent of said transparent spokes and the least opaque of said opaque spokes are next to each other at the opposite side of said one flat surface of said disc, whereby discrimination between a target signal and background can be achieved.

2. The device of claim 1 where the disc comprises glass having varying areas of opaque metal on the glass in the checkerboard pattern whereby varying degrees of transparency and opaqueness are secured.

3. The device of claim 1, wherein the three frequencies which are reinforced are the $n/2-1$th, $n/2$th, and the $n/2+1$th harmonics.

References Cited in the file of this patent

UNITED STATES PATENTS

| 1,930,137 | Twyman | Oct. 10, 1933 |
| 1,934,400 | Bollman | Nov. 7, 1933 |
| 1,954,338 | Tuttle | Apr. 10, 1934 |
| 2,421,012 | Chew | May 27, 1947 |
| 2,678,581 | Reisner | May 18, 1954 |

FOREIGN PATENTS

| 33,746 | Holland | Oct. 15, 1934 |